UNITED STATES PATENT OFFICE.

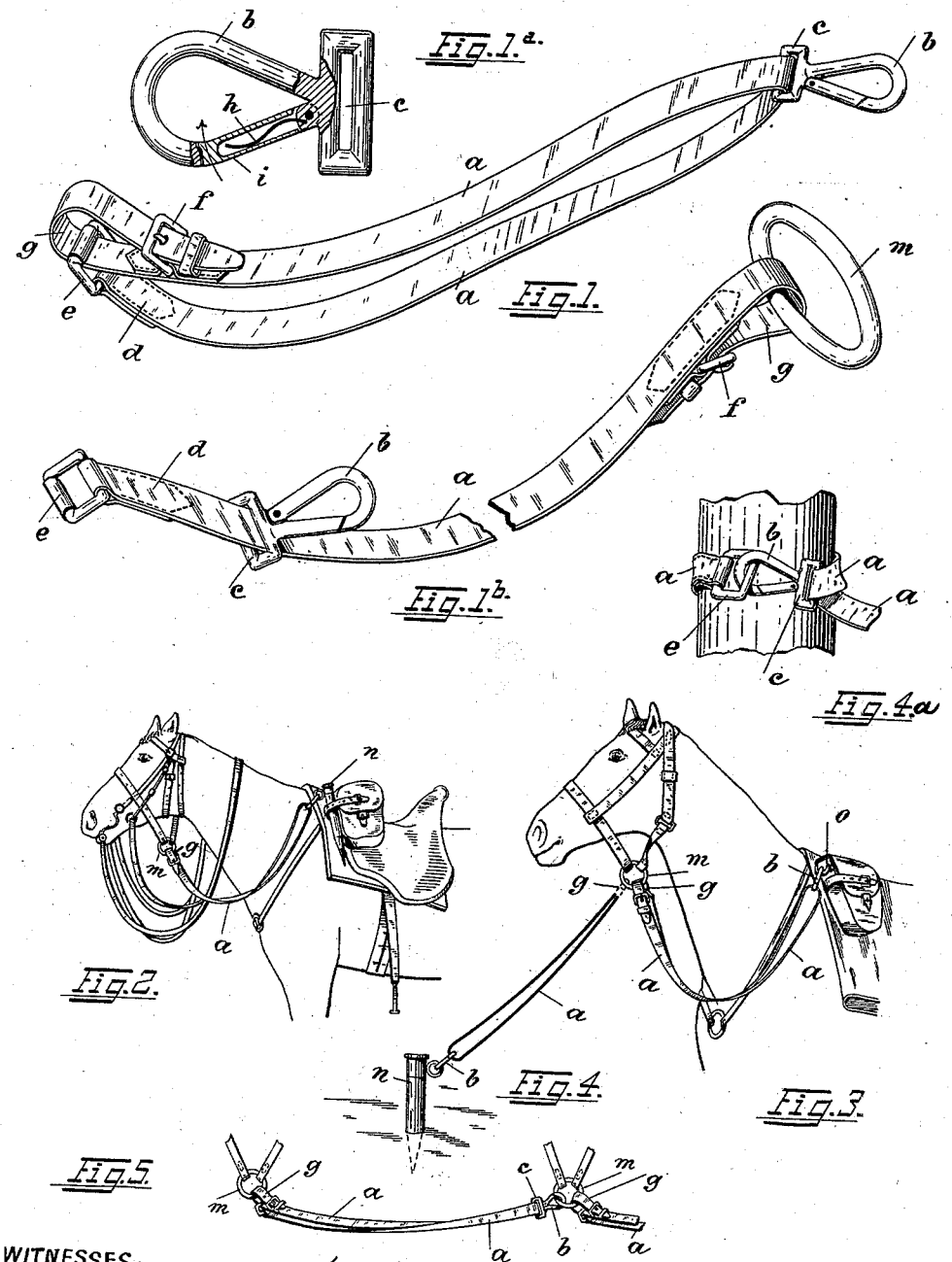

ISIDOR VON RISCH, OF POSTELBERG, AUSTRIA-HUNGARY.

HITCHING-STRAP.

SPECIFICATION forming part of Letters Patent No. 542,500, dated July 9, 1895.

Application filed December 13, 1894. Serial No. 531,738. (No model.)

*To all whom it may concern:*

Be it known that I, ISIDOR VON RISCH, K. and K. oberlieutenant, a subject of the Emperor of Austria-Hungary, residing at Postelberg, Bohemia, Austria-Hungary, have invented a new and useful Fastening-Strap for Horses, especially for Military Riding-Horses, of which the following is a specification.

This invention relates to an improved hitching or picketing device or strap for horses, and is shown in the accompanying drawings.

Figures 1 to 1$^b$ show the entire device by itself; Figs. 2 to 5, the method of using it.

The hitching or picketing strap shown in Figs. 1, 1$^a$, and 1$^b$ consists of a long strap $a$, on which a snap-hook $b$ is fitted by means of its rectangular part $c$. The buckle-frame $e$, secured on the end $d$, prevents the sliding snap-hook from dropping off, while near the other end an ordinary buckle $f$ is attached, in which the remaining part $g$ of the strap may be buckled for the purpose of forming a loop.

The peculiarly-formed snap-hook $b$, as shown in Fig. 1$^a$, partly in longitudinal section, contains the spring $h$, arranged within the movable part $i$, so that it is impossible for the spring to get damaged from the outside.

When in use, the strap is buckled up in the manner shown in Fig. 1, the loop $g$ being passed through the halter-ring $m$, Fig. 2, and the snap-hook $b$ is snapped into the ring of the tethering-peg $n$, which is carefully packed up and carried along with the rider on the horse. In this case, as in the following examples, it is assumed that the horse is a cavalry-horse saddled in the usual manner.

If on a short journey and the peg be not carried, the snap-hook $b$ is hooked in the strap $o$ of the holster-buckle, Fig. 3.

If the horse has to be fastened up, the snap-hook is merely disengaged from the peg, the latter driven into the ground, and the snap-hook again attached to it, as shown in Fig. 4, and thus the horse is tethered in the quickest manner possible.

If the peg should have been left behind, the snap-hook may be merely hung on a door-bell handle, wall-hook, tree, or fence, whichever may happen to be the most convenient.

If the strap $a$ be used alone, the loop may be unbuckled at $f$, the strap $g$ drawn out of the halter-ring $m$, the buckle-frame $e$ released, and the strap again fastened with the loop $g$ in the halter-ring, Fig. 1$^b$.

The snap-hook $b$ is prevented from dropping off, as already stated, by the part $e$.

Fig. 4$^a$ shows the mode of fastening the strap to a post or a railing.

If two or more horses are to be fastened together by means of this strap, the snap-hook $b$ of the one horse is merely hooked into the halter-ring of the other horse, which operation may easily be done by the rider sitting on one of the horses. In this way several horses may be connected together very easily and be guided by one man. In this way, also, the snap-hook $b$, instead of being engaged in the halter-ring of the next horse, may be hooked in the snaffle-ring, which is of special advantage.

Having thus described my invention, what I claim as new, and desire to secure by Letters Patent, is—

An improved hitching strap or device for horses, more particularly for saddle horses employed for military purposes, consisting of a strap $a$, a sliding snap hook $b$ arranged on said strap, a buckle frame firmly secured to one end ($d$) of the strap, and a buckle $f$ firmly secured near the other end of the strap, said latter end ($g$) being fastened up into a loop by means of the said buckle $f$, said loop being adapted to engage the buckle frame $e$ (or the halter ring $m$) all said parts, substantially as and for the purposes described and illustrated.

In testimony whereof I have signed this specification in the presence of two subscribing witnesses.

ISIDOR VON RISCH.

Witnesses:
STANISLAUS RTH. URSYN-PRUSXYNCK,
RUDOLF VON WOLFRAM-WOLMAR.